Sept. 22, 1959   W. GUIER ET AL   2,905,200
PULSATION DAMPER
Filed April 21, 1958

WILLIAM GUIER
ROY H. DEITRICKSON
*INVENTORS*

BY Bruce M. Thomas

ATTORNEY

United States Patent Office 2,905,200
Patented Sept. 22, 1959

2,905,200

PULSATION DAMPER

William Guier, Tulsa, Okla., and Roy H. Deitrickson, Toledo, Ohio, assignors to The National Supply Company, Pittsburgh, Pa., a corporation of Ohio Application April 21, 1958, Serial No. 729,931

12 Claims. (Cl. 138—26)

The present invention is directed to a pulsation damper for reducing the surge which is inherent in the discharge line of any reciprocating type pump.

A cushioning or power absorbing means is necessary to smooth out the pulsations which occur in the fluid at each delivery stroke of the pump piston. Heretofore, several devices have been employed to accomplish this end. One device is an air chamber which is usually a cylinder closed at one end with the other end open in direct communication with the discharge line of the pump, as for example, that shown in Patent No. 1,680,480. This chamber is normally at atmospheric pressure. When the pump is started, discharge fluid enters the chamber compressing the air therein until it reaches the discharge pressure of the pump. The entrapped air then acts as a cushion to damp out the pressure surges of the fluid in the discharge line. The main objection to this type of damper is the fact that in order to have a sufficient volume of compressed air to accomplish the desired cushioning, it is necessary to have an abnormally large chamber. As an example, when operating the pump at a discharge pressure of 3000 p.s.i. it would be necessary for the chamber to be 200 times the size of the compressed air volume needed for suitable damping.

Another type of damper is the so-called bladder type. This device has a chamber in which a diaphragm separates the pumped fluid from the air. Having this diaphragm, it becomes possible to pre-charge the chamber to a pressure considerably in excess of atmospheric pressure, thus reducing the size of chamber needed for a desired cushioning effect. The bladder type falls into two general categories.

One type has a screen or other support for limiting the expansion of the bladder, as shown in Patent No. 2,563,257. As the mud enters the chamber, it moves the bladder upwardly away from the screen or support, compressing the air therein.

The second type uses a valve member integral with the bladder, which cooperates with a valve seat in the lower portion of the chamber to retain the pre-charged pressure as shown in Patent No. 2,757,689. The function of both is much the same.

The main disadvantage of this type of damper is that, due to the power surges occurring on each stroke of the pump, the bladder is constantly vibrating and is subject to fatigue failure after considerable use. It is also possible for the bladder or valve to close off the discharge opening before all of the fluid has drained from the chamber.

The present invention combines the advantages of both dampers and, at the same time, eliminates the disadvantages of both. A valve is used to retain the pre-charged pressure in the air chamber, while the pump is not running, but no diaphragm is used. The chamber is charged either by rig air pressure or some other source, such as a compressed air bottle, and this pressure will retain the valve in closed position. When the pump is started, the pressure in the discharge line forces the valve open, and permits pumped fluid to enter the chamber. Since the air in the chamber can be at a pressure considerably in excess of atmospheric pressure, a chamber much smaller than the size of an open-end chamber will be sufficient to provide the same damping effect. At the same time, there is no diaphragm to fail, thus releasing the precharged air when the pump is stopped.

An object of this invention is to provide a pulsation damper which will absorb presure surges in the discharge line of a pump.

A further object of this invention is to provide a pulsation damper which can operate with a pre-charged air volume, thus reducing its overall size.

A still further object is to provide a valve in a damper chamber which will permit the maintaining of a pre-charged gas pressure when the pump is not running.

Another object is to provide a valve to retain a pre-charging pressure in a chamber which, when open, permits the fluid pumped and the pre-charging gas to be in mutual contact.

A further object is to provide a pre-charged pulsation damper which permits substantially all of the pumped fluid to drain out before the valve closes to retain the pre-charged gas therein.

Another object is to provide a valve which is caused to close upon a drop in pressure in the chamber below a pre-determined minimum.

A still further object is to provide a damper in which air pressure can be made up during down-time for the pump.

In accomplishing these, and other objects of the invention as hereinafter disclosed, I have provided an improved structure, the preferred embodiment of which is illustrated in the accompanying drawings, wherein.

Figure 1:
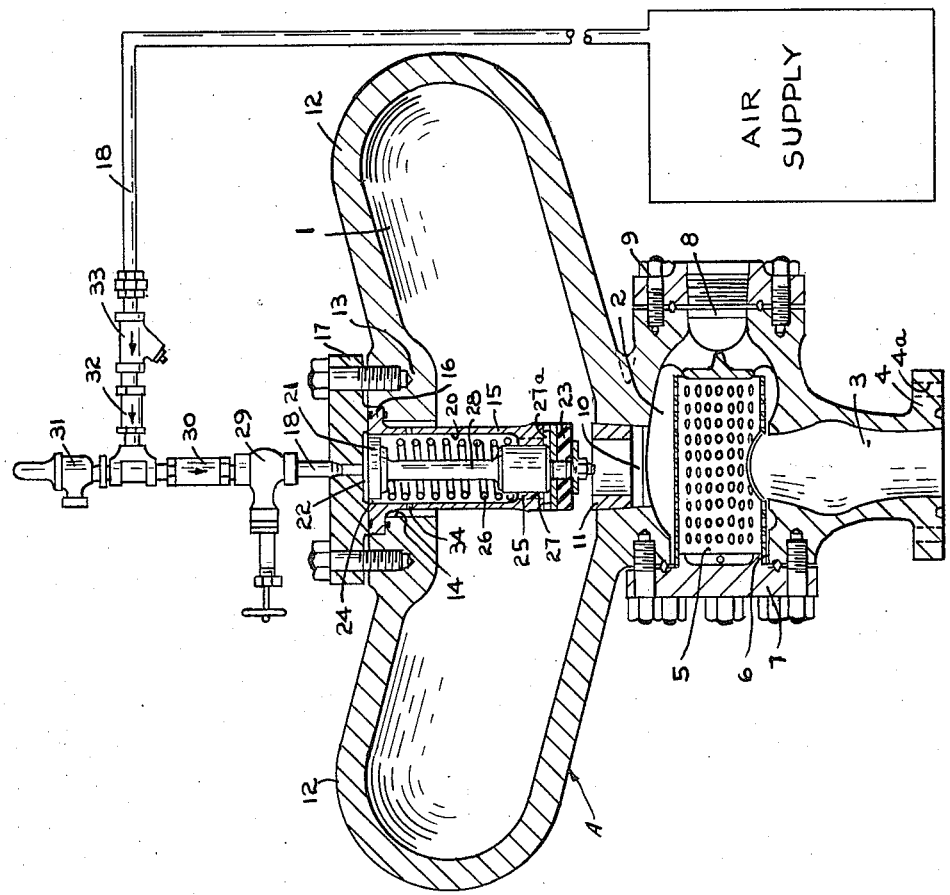
Fig. 1 is a side elevation of the damper in section showing the valve in the open position.

Fig. 1 shows a pulsation damper with an air or pulsation damping chamber designated 1 and a strainer and discharge cross designated 2 connected thereto. Chamber 1 is defined by hollow casing means indicated generally at A. The cross has an inlet passage 3 and a suitable flange 4 with bolt holes 4a, capable of being attached to the discharge line of a pump. A strainer 5 is mounted in the cross at right angles to the fluid entrance and can be inserted and withdrawn through bore 6 which is closed by head 7 mounted on the cross. The discharge bore 8 of the cross is provided with studs 9 which are utilized in connecting to a flow line, not shown. Thus, fluid entering passage 3 passes thru the strainer before being discharged through bore 8. This prevents foreign material from being pumped through the discharge line.

A passage 10 connects the cross with the air or pulsation damping chamber 1 and has a valve seat 11 mounted at the upper end thereof. The casing means A consists of two lobes 12, generally cylindrical in cross-section, which are inclined slightly from the horizontal, and a central body portion 13. A bore 14 is provided in the upper end of the chamber and a sleeve member 15 with a flange 16 is mounted therein. The sleeve member defines a piston chamber extending into the interior of pulsation damping chamber 1 and is held in place by a head member 17 which closes the upper end of the sleeve member and has connected thereto a line 18 to a source of fluid pressure. Piston member 19 is mounted for reciprocation in the bore 20 of sleeve member 15. The piston has a head 21 at the upper end thereof which combines with head 17 and the bore 20 to define an expansible pressure fluid inlet chamber 22, the volume of the expansible chamber 22 depending upon the position of piston head 21 in bore 20. A valve member 23 is mounted at the other end of piston member 19 and co-acts with valve seat 11 to close passageway 10 between the cross 2 and air chamber 1. The piston 21 has a limited annular clearance 24 between it and bore 20 the purpose of which will be later explained. An inwardly directed annular shoulder 25 is formed in the bottom end of bore 20. A spring 26 acts between shoulder 25 and piston head 21 to urge the piston upwardly in a valve opening direction. Passages 27 are provided in shoulder member 25 which cooperate with grooves 27a in the end face of sleeve 15 to permit passage of fluid between valve member 23 and sleeve 15 when the valve is in the open position. The body of piston member 19 is necked down at 28 to increase the volume of the air space in sleeve 15 between bore 20 and piston 19. Since the air will be compressed the same amount inside the sleeve as it is in the chamber 1, the larger the volume of air in the sleeve the less chance there is of the pumped fluid entering chamber 22 through clearance space 24.

Figure 2:
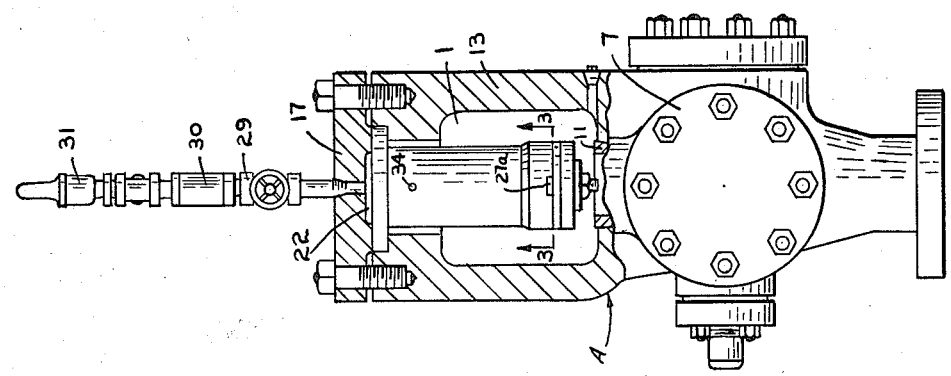
Fig. 2 is an end view partly in section of the damper shown in Fig. 1.
Figure 3:
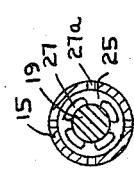
Fig. 3 is a section taken on line 3—3 of Fig. 2.

As will be clear from Figs. 1 and 3, the lower portion of piston member 19 is slidably disposed in the bore afforded by annular shoulder 25, so that the shoulder 25 acts not only as a seat for spring 26 but also as means for guiding piston member 19 during reciprocatory movement of the piston member. From Figs. 1 and 2, it will be apparent that openings 10 and 14 in the casing means A are aligned across chamber 1 so that, in this embodiment of the invention, the valve member 23, cooperating with seat 11, can be rigidly attached directly to the piston member 19. Mounting of sleeve member 15 in the opening 14 is such that the sleeve member extends directly toward opening 10. Thus, in acting as a guide for piston member 19, shoulder 25 also assures that the travel of valve member 23 is properly aligned with respect to opening 10 and valve seat 11.

Fluid pressure supply line 18 communicates directly with expansible chamber 22. Thus, as will be clear from Fig. 1, line 18 is arranged to admit fluid under pressure on the side of piston head 21 facing outwardly with respect to the pulsation damping chamber.

Assuming the damper is being used on a drilling rig which has numerous air controls and a compressed air supply system, line 18 would be connected to this supply. To retain the high pressure in the damper created during pumping, and protect the rig air supply system, a system of valves is utilized. A valve 29 is mounted in line 18 directly adjacent the head 17 which valve can shut off the fluid flow to and from the damper. Directly above the valve 29 is a high pressure primary check valve 30. This would be sufficient if an air bottle or similar high pressure source is used. When the air supply of a rig is used, it must be protected from failure of valve 29. To accomplish this a T fitting can be added to permit the mounting of relief valve 31 and secondary check valve 32 in direct fluid communication with each other and valve 30. A sediment separator 33 is connected to valve 32 and the source of air pressure (not shown) via line 18.

Although the damper has been described with a strainer and discharge cross, it can be supplied without one if it is not needed. In such a case, the flange connection would be at the end of passage 10 and the cross would be eliminated.

The operation of the device is as follows: The device is mounted, by means of its flange connection 4, to the discharge line of a pump. If the source of air is the rig air system, line 18 is connected thereto. Valve 23 is then held in the up or open position by spring 26. Valve 29 is manually opened. Both check valves 30 and 32, which may be set to open at a low pressure, for example 9 p.s.i., are closed. The relief valve 31 is set at an intermediate pressure well above the pressure of the air supply source yet well below the pump discharge pressure. Its function is to protect valve 32 in the event valve 30 fails. For example, it can be set at 275 p.s.i. Air is then permitted to enter line 18 from the compressed air source. It passes sediment separator 33 where any foreign material is removed, thus protecting the check valves. The air then passes through check valves 32 and 30 to enter expansible chamber 22. The annular clearance space 24 is small enough to cause a pressure drop across the piston head 21 as the fluid flows past it. This drop may be in the order of 5 p.s.i. The pressure build-up in expansible chamber 22 is sufficient to overcome the bias of spring 26 and to force the piston downwardly closing valve 23 against valve seat 11. Air will continue to flow past the piston head 21 and through the sleeve 15 and passages 27 into the air or pulsation damping chamber 1, until the pressure is equal to the pressure at the source. The damper is now charged and ready to operate.

When the pump is started, the discharge fluid will enter the passage 10 under the valve 23 which is held closed by pre-charged air acting over its entire area within the chamber 1. When the discharge pressure is sufficient to overcome the pressure holding it closed, the valve 23 will open. Spring 26 will then act to open the valve completely and hold it in its full open position since the fluid pressure on the valve is equalized. The fluid from the pump will then continue to enter the chamber 1 compressing the air trapped therein. As the air in sleeve 15 is compressed by fluid entering through passages 27a and 27, it will flow back through clearance space 24 into chamber 22 building up its pressure and forcing check valve 30 closed. Further operation of the pump will cause the entrapped air to reach the discharge pressure of the pump. This occurs both in the pulsation damping chamber proper and in the sleeve 15 and expansible chamber 22. Because of the volume of air in sleeve 15 and the smallness of chamber 22 including the volume up to check valve 30 none of the pumped fluid will pass piston head 21 which would permit clearance 24 to clog. To further insure against this, port 34 is placed in the sleeve 15. When the fluid level rises inside the sleeve faster than outside, due to volume differences, the fluid can pass out and more high pressure air enter through the port.

When the air pressure reaches the pump discharge pressure no further flow into the pulsation damping chamber takes place. The air then acts as a cushion to damp out the pulsating surges caused by the delivery strokes of the pump. Since the air was pre-charged before operation a much smaller volume is needed to provide suitable damping. The valve 23 is held fully open by spring 26 and is not subject to the surges in the fluid and thus is not subject to the high wear and fatiguing which would prevail if it vibrated.

If, at any time during the operating cycle, check valve 30 should fail, the fluid is prevented from flowing to the source by check valve 32. This would otherwise be dangerous to the air system of a rig, since such an occurrence could render all air controls inoperative. To further insure this not happening, valve 32 is protected by relief valve 30 set at a lower pressure than the pump operating pressure. Valve 32 need only hold this lower pressure. When the pump operator sees the relief valve leaking fluid, he can close valve 29 to retain the air in the chamber. Valve 30 can then safely be repaired or replaced without shutting down the pump by cutting off the air supply and removing the valve.

When the pump is shut down, it is necessary that all of the fluid and any sediment therein drain from the damper before valve 23 closes. This is done so that all of the volume of the damper is used to provide air for damping. If fluid or sediment remains in the pulsation damping chamber, a smaller volume of air will be available for damping on a subsequent cycle. Spring 26 and clearance space 24 combine to accomplish this function.

The compressed air in the pulsation damping chamber will force the fluid to drain from the damper due to the reduction in pressure in the discharge line of the pump. The lobes 12 are tipped up to provide a downward sloping lower surface to aid in the outflow of fluid and sediment through the valve seat 11. The air trapped in chamber 22 will flow through clearance space 24 to force the fluid out of the sleeve 15 through passages 27 and 27a. This flow is slow enough so that the pressure drop across piston head 21 is not sufficient to counteract spring 26 and close valve 23. During this period, the pressure below valve 30 is sufficient to maintain it closed against the pressure of the air supply source. When the last of the fluid leaves the chamber the air, which is still at or near the precharging pressure, will start to flow out giving a pressure drop across piston head 21, because of the limited clearance 24, sufficient to overcome spring 26 and force the valve down. If any make-up air is necessary, it can now flow from the air source through the check valves into the air chamber, as described in the initial starting operation, until the chamber is again at the pre-charge pressure of the source.

Having fully described our invention, it is to be understood that we are not to be limited to the details herein set forth, but that our invention is of the full scope of the appended claims.

We claim:

1. A pulsation damper comprising a hollow body, an inlet passage in one wall of said body, a valve seat in said passage, a valve member cooperating with said valve seat to close said passage, a cylindrical sleeve member extending into said body from a side opposite to said inlet passage, a piston slidably mounted in said cylinder and connected to said valve member, said piston and cylinder forming an expansible chamber on one side of said piston, a spring mounted in said sleeve member abutting the other side of said piston and biasing said piston toward said expansible chamber, a source of fluid pressure connected to said chamber, and orifice means creating a pressure drop across said piston when pressure fluid flows from said one side of the piston to said other side whereby a force is exerted on said piston in a direction opposite to the bias of said spring.

2. A pulsation damper for a flow duct containing liquid under pulsating pressure including a housing having a pulsation damping chamber and a pressure transmission passage communicating with said pulsation damping chamber, a valve seat in said passage, a valve member cooperating with said valve seat for operatively closing said passage, a cylinder connected to a source of fluid pressure, a piston slidably mounted in said cylinder, orifice means permitting a flow of fluid from one side of said piston to the other causing a pressure drop across said piston, said piston being operatively connected to said valve member, a spring biasing said piston in the valve opening direction whereby said valve will remain in the open position until the pressure drop across said piston reaches a predetermined value thereby exerting a force on said piston in the valve closing direction and closing said valve.

3. A pulsation damper for use with a pressure fluid transmission system subject to periodic surges of pressure fluid comprising, a hollow body member having an inlet passage for connection to said fluid system, valve means for closing said passage comprising, a valve member, a piston operatively connected to said valve member, a sleeve surrounding and slidably receiving said piston, said sleeve engaging said hollow body member and being closed at one end to form an expansible chamber above said piston whereby the piston will be urged in a valve closing direction when the pressure in said expansible chamber exceeds the pressure in said hollow body.

4. A pulsation damper comprising a hollow body member having an inlet passage therein, valve means for said passage, a sleeve member closed at one end connected to said hollow body, a piston member slidably mounted in said sleeve and operatively connected to said valve means, said piston and sleeve combining to define an expansible chamber above said piston, means permitting a limited rate of flow of fluid from one side of said piston to the other, spring means urging said piston in the valve opening direction, a source of fluid pressure connected to said expansible chamber whereby the piston will be urged in a valve closing direction when the pressure in said expansible chamber exceeds the pressure in said hollow body.

5. A pulsation damper comprising a hollow body member having an opening therein, a valve seat in said opening, a second opening in said body member, valve operating means mounted in said second opening, a closure member mounted on said body forming with said valve operating means a pressure fluid inlet chamber, a source of constant pressure fluid connected to said chamber, means permitting a limited flow of pressure fluid from said chamber to the interior of said hollow body member, valve means operatively connected to said valve operating means whereby the valve means will be urged toward said valve seat when the pressure in said chamber exceeds the pressure in said hollow body member.

6. A pulsation damper comprising a hollow body member having an opening therein, a sleeve mounted in said opening and extending into said hollow body member, a piston member slidably mounted in said sleeve, a valve member operatively connected to said piston, a second opening in said hollow body member, a valve seat in said second opening, a closure member mounted on said body member, said closure member closing said first-mentioned opening and forming a pressure fluid inlet chamber within said sleeve, a source of fluid pressure connected to said chamber whereby said piston is urged in a valve closing direction when the pressure in said chamber exceeds the pressure in said hollow body member.

7. In a pulsation damper for use with a pressure fluid transmission system wherein the fluid is subject to periodic pressure variations, the combination of hollow casing means defining a pulsation damping chamber having an opening for connection to the fluid transmission system; a valve member operatively associated with said opening, means carried by said casing means and defining a piston chamber extending toward the interior of said pulsation damping chamber, a piston disposed for reciprocable movement in said piston chamber, said valve member being connected to said piston for movement thereby, and means connected to said piston chamber for admitting fluid under pressure thereto on the side of said piston facing outwardly with respect to said pulsation damping chamber, the other side of the piston being subjected to the pressure within said pulsation damping chamber, whereby the piston will be urged in a valve-closing direction when the pressure of the fluid admitted to said piston chamber on the side of said piston facing outwardly with respect to said pulsation damping chamber exceeds the pressure in said pulsation damping chamber.

8. In a pulsation damper for use with a pressure fluid transmission system wherein the fluid is subject to periodic pressure variations, the combination of hollow casing means defining a pulsation damping chamber having an opening for connection to the fluid transmission system; a valve member operatively associated with said opening; a cylinder carried by a wall of said casing means opposite said opening, said cylinder extending in the direction of said opening; a piston disposed to reciprocate in said cylinder; means connecting said valve member to said piston whereby travel of said piston inwardly of said chamber moves said valve member in a direction to close said opening and opposite travel of said piston moves said valve member in a direction to open said opening; and means for admitting fluid under pressure to said cylinder on the side of said piston opposite said valve member, the other side of said piston being subjected to the pressure within said chamber.

9. A pulsation damper in accordance with claim 8 and wherein space is afforded between said piston and cylinder, whereby a pressure drop occurs across said piston when the pressure fluid admitted to said cylinder flows past said piston in a direction toward the interior of said pulsation damping chamber, said means connecting said valve member to said piston comprising a piston rod, the pulsation damper also comprising guide means carried by said cylinder and operatively associated with said piston rod to guide the same during reciprocatory movement of the piston, and a spring operatively associated with said piston and biasing the same in its valve-opening direction.

10. In a pulsation damper for use with a pressure fluid transmission line wherein the fluid is subject to periodic pressure variations, the combination of hollow casing means defining a pulsation damping chamber provided with a pair of generally aligned openings, means for connecting one of said openings to the fluid transmission line, a cylinder, means mounting said cylinder in the other of said openings with said cylinder projecting into said chamber toward said one opening, a piston disposed in said cylinder for reciprocatory movement toward and away from said one opening, a movable valve member operatively associated with said one opening, means extending within said cylinder and connecting said valve member to said piston, whereby movement of said piston toward said one opening moves said valve member in a direction to close said one opening while movement of said piston in the opposite direction moves said valve member away from said one opening, and means for admitting fluid under pressure to said cylinder on the side of said piston opposite said one opening, the opposite side of said piston being subjected to the fluid pressure within said chamber, whereby said piston is urged toward said one opening when the pressure admitted to said cylinder on the side of said piston opposite said one opening exceeds the pressure within said chamber.

11. A pulsation damper in accordance with claim 10 wherein said means connecting the valve member to the piston is a piston rod and said cylinder is provided with a portion slidably engaging said rod in guiding relationship.

12. In a pulsation damper for use with a pressure fluid transmission line wherein the fluid is subject to periodic pressure variations, the combination of hollow casing means defining a pulsation damping chamber having an opening for connection to the fluid transmission line; a movable valve member operatively associated with said opening; valve operating means operatively associated with said valve member, said valve operating means including a piston; cylinder means carried by said casing means and cooperating with said piston to define an expansible chamber, the effective volume of which depends upon the position of said piston; means connected to said cylinder means and operative to admit fluid under substantially constant pressure to said expansible chamber, means being provided allowing a limited flow of pressure fluid from said expansible chamber past said piston to the interior of said pulsation damping chamber; and resilient means operatively connected to said piston and urging the same in a direction decreasing the volume of said expansible chamber, said valve operating means imparting movement to said valve member to open said opening when said piston is moved in said volume decreasing direction and to close said opening when said piston is moved in the opposite direction.

References Cited in the file of this patent
UNITED STATES PATENTS

| | | |
|---|---|---|
| 592,872 | Lormant | Nov. 2, 1897 |
| 1,703,143 | Greve | Feb. 26, 1929 |
| 2,256,370 | Adams | Sept. 16, 1941 |
| 2,264,517 | Foster | Dec. 2, 1941 |
| 2,638,932 | Alexander | May 19, 1953 |
| 2,697,451 | Knauth | Dec. 21, 1954 |
| 2,731,038 | Purcell | Jan. 17, 1956 |